Aug. 18, 1964     O. V. PAGE     3,145,316
ELECTRICAL CURRENT CONDUCTING BRUSH ASSEMBLY
Filed April 26, 1961
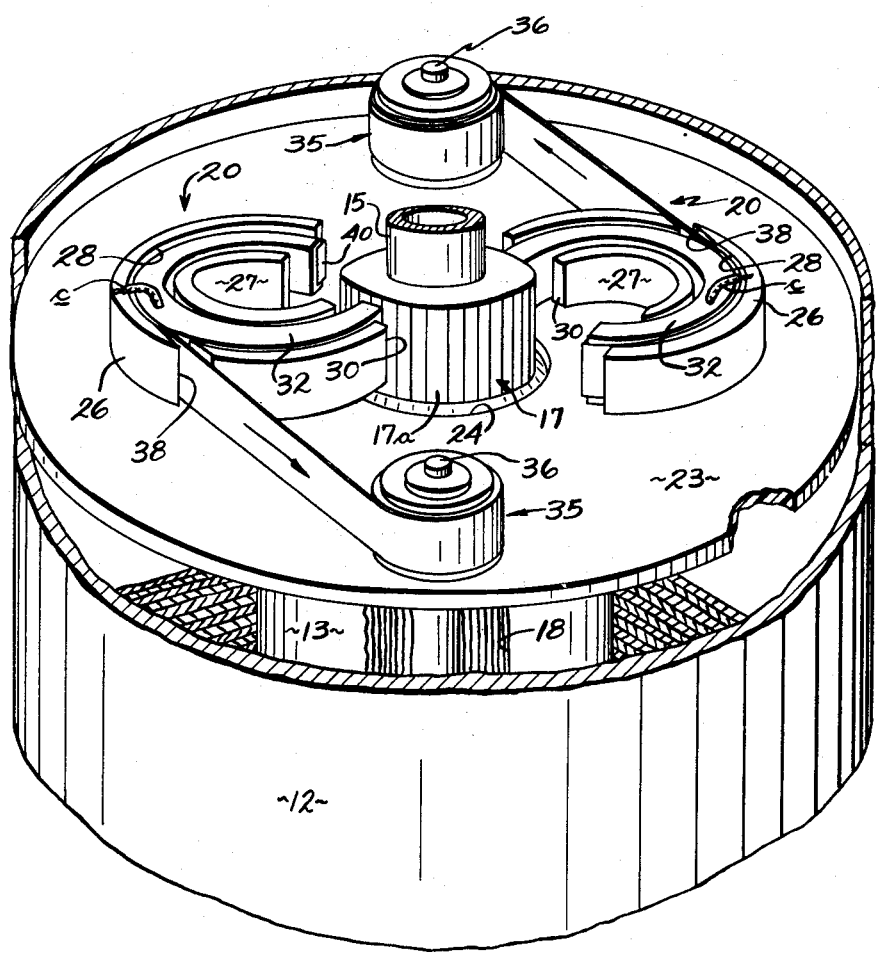
INVENTOR.
OSWALD V. PAGE
BY
Meyer, Baldwin, Dean & Young
ATTORNEYS

United States Patent Office 3,145,316
Patented Aug. 18, 1964

3,145,316
ELECTRICAL CURRENT CONDUCTING
BRUSH ASSEMBLY
Oswald V. Page, Mansfield, Ohio, assignor to Barnes Manufacturing Company, Mansfield, Ohio, a corporation of Ohio
Filed Apr. 26, 1961, Ser. No. 105,617
1 Claim. (Cl. 310—246)

This invention relates to an electric current conducting brush assembly especially designed for use with an electric motor and/or generator.

Heretofore, an electric motor and/or generators utilizing electrical current conducting brush assemblies for transferring electrical current to or from the commutating member of the said motive unit, the conducting brush elements utilized in said assemblies have been of linear construction usually rectangular or square in longitudinal configuration and disposed in suitable holding means adjacent the commutating member of the motor or generator wherein one end thereof is urged against said commutating member by means of suitable pressure means such as for example a coil spring or the like.

The brush element is usually located radially of the axis of the aforesaid commutating member or at a predetermined angular relation to the same, one of the reasons for the latter arrangement, as is well known, to thereby enable said brush element to carry larger magnitudes of current. Still another reason is to enable a smaller brush pressure to be used.

As will be recognized in this type of assembly, the pressure exerted on the brush element varies according to the length of the brush so that during its normal operating life various pressures are exerted on the underlying commutating member thereby causing the latter to wear at a rate that is unnecessarily excessive and likewise of such variable pressure as to cause the conducting brush to also wear at an uneven rate.

Still another disadvantage in prior art current conducting brush assemblies of the type above described, relates to the physical size of the electric motive device to which it is adapted, whereby the length of brush element capable of being used in said device is thereby limited, which dimensions, in turn, determine the effective operating life of said brush element.

Other disadvantages will be readily apparent to those skilled in the art which identifies and/or indicates in part the operating and structural limitations of the aforesaid prior art electrical current conducting brush and assemblies therefor.

It is therefore a primary object of the present invention to provide a new and improved electric current conducting brush assembly especially designed for use with an electric motor and/or generator or the like, and which assembly includes a current conducting brush which has an exceedingly longer operating life than heretofore possible to obtain.

Another object of the present invention is the provision of a new and improved electric current conducting brush assembly especially designed for use with an electric motor and/or generator or the like, and which assembly utilizes a current conducting brush element of non-linear configuration and which therefore is capable of providing a substantial greater operating life to said assembly.

Another object of the present invention is the provision of a new and improved electric current conducting brush assembly especially designed for use with an electric motor and/or generator, and which assembly utilizes an electrical current conducting brush element of non-linear configuration and which, in turn, is urged by pressure means exerting a substantially constant force against said brush element and the commutating member of said motive device engaged thereby.

Still another object of the present invention is the provision of a new and improved electrical current conducting brush assembly especially designed for use with an electric motor and/or generator, and wherein the brush element of the said assembly is of arcuate configuration and has its one end in engagement with the commutating member of said motive device, and wherein spring means in engagement with the opposite end of said arcuate brush element exerts a constant force against the same to thereby urge said element against said commutating member under a substantially constant brush pressure.

Additional objects and advantages of the electric current conducting brush assembly of the present invention will be apparent to one skilled in the art to which it pertains and upon reference to the following specification of a preferred embodiment thereof and which embodiment is illustrated in the accompanying single drawing forming a part of this specification and which drawing is seen to be a fragmentary perspective view of a direct current motor utilizing a pair of electric current conducting brush assemblies, each embodying the concepts of the present invention.

Referring now to the aforesaid drawing, the electric current conducting brush assembly of the present invention is herein illustrated for use with an electric motive device 10 which, merely for purposes of the instant disclosure, is a two-brush, direct current motor of conventional construction and which has a stator component 12 rotatably mounting an armature 13, the latter having a shaft 15 which, in turn, mounts a commutating member, the latter being identified in its entirety by the reference numeral 17.

As will be understood, the commutating member 17 has the ends of the armature coils 18 connected to the individual commutating bars 17a thereof in such manner as to enable electrical current to be supplied to the same in the usual manner so as to obtain the normal resultant motor action for said device.

To supply said electrical current to the armature commutator 17 a pair of electrical current conducting brush assemblies, each embodying the present invention and herein identified in the entirety by the reference numeral 20, is attached to the motor stator 12 so as to be stationary relative to the armature 13.

For this purpose, each of the brush assemblies 20 is seen to be mounted on a flat carrier plate 23, the latter being preferably securely fastened by any suitable means to the stator housing 12a so as to extend transversely across one end thereof preferably perpendicular to the axis of armature shaft 15. Said carrier plate is provided with an opening 24 formed centrally therein through which the end of the armature shaft 15 mounting the commutator member 17 thereon projects in such manner so as to locate the latter centrally between the aforesaid conducting assemblies 20.

Each of the brush assemblies 20 is seen to include a brush holder formed of an outer wall 26 and an inner wall 27 each securely fastened in an upright position to the carrier plate 23, being in addition, spaced apart so as to define an arcuate brush channel 28 therebetween, said walls likewise being preferably semi-circular in longitudinal configuration and having a wrap of approximately 200 degrees. As will be hereinafter apparent, said walls may be somewhat less or greater in said longitudinal extension.

Each of the brush holders is securely fastened to the carrier plate 23 on opposite sides of the shaft 15 so as to locate its one end 30 in closely spaced relation to the commutator member 17.

An electrical current conducting brush member 32, formed of a conventional brush material such as carbon, is disposed in each of said brush holders, said brush member being arcuate in longitudinal configuration, having a constant radius and preferably having a wrap of approximately 225 degrees.

In its present form, the brush member 32 is rectangular in section and of corresponding dimension so as to be readily slidably disposed in the aforesaid brush channel 28.

As will be apparent, the sectional configuration of the brush member 32 and likewise its accommodating brush holder channel 28 may partake of several different forms, for example square, circular or arcuate configuration, the instant rectangular embodiment being shown herein merely for purposes of the instant disclosure.

As will likewise be apparent, the longitudinal wrap of the arcuate-shaped conducting brush member 32 may also be somewhat more or less than the preferred embodiment disclosed herein.

As is seen in the aforesaid drawing, one end of each brush member 32 is urged against the commutator member 17 to thereby enable electrical current to be supplied to the same. A suitable conductor c is attached to each of said brush members to thereby enable the latter to be connected to a source of electrical energy as will be understood.

As aforementioned, each brush member 32 is intended to be urged against the commutator member 17 by means exerting a constant force thereon.

For this purpose, a spring element identified at 35 and which is referred to in the art as a "negator" spring, is mounted on the aforementioned carrier plate 23 adjacent each of the brush holders.

As is well understood, a "negator" spring is a spirally wound spring of such character that it is in equilibrium when fully wound, and which is adapted when unwound to return to its wound condition.

As seen in the aforementioned drawing, each spring element 35 is formed of a suitable spring ribbon-like material, and is placed onto a shaft 36 rotatably mounted on the carrier plate 23 adjacent each brush holder.

The inner end of each spring element 35 is firmly attached to its associated shaft 36, said spring element being partially unwound and passed through a slot 38 formed in the outer brush holder wall 26 adjacent thereto, thence around the outside surface of the brush member 32 disposed in the channel 28, the outer end of said spring element as is indicated at 40 being preferably bent around the remote end of said brush member 32.

As is aforesaid, the "negator" spring element when unwound tends to return to its wound condition, and since it is restrained by engaging the said remote end of the brush member 32, its characteristics are such that it exerts a constant force on said brush member, and consequently the latter is urged into engagement with the commutator member under a substantially constant brush pressure.

With this assembly, it will now be realized that as the brush member 23 gradually wears away, the "negator" spring likewise gradually rewinds so as to advance the same through its holder so as to maintain said brush member in constant engagement with the commutator member.

And as will likewise be apparent with the brush member 32 being of arcuate configuration, a substantially greater brush length may be accommodated in an electric motor and/or generator of minimum dimensions than heretofore possible to obtain.

As will also be realized, the brush member 23 is urged by said "negator" spring against the commutator member 17 so as to have a brush pressure that is substantially constant throughout the effective operating life of said brush member whereby wear of said cooperating components is maintained at a minimum.

Having thus described a preferred embodiment of electrical current conducting brush assembly of the present invention, it will be apparent that the same is susceptible to various modifications, combinations and arrangements of parts without departing from the inventive concepts thereof as are defined in the claim.

What is claimed is:

In an electric motive device having a rotatable commutating member, an electric current conducting brush assembly including a brush member having an arcuate conducting body portion of substantially constant radius, means for supporting said body portion adjacent said commutating member, a conducting surface on one end of said body portion for engagement with said commutating member, and means for urging said brush member into engagement with said commutating member including a normally wound spring having its one end secured to and in equilibrium with a shaft which is free to rotate, means securing the opposite end of said spring to the opposite end of said brush member, said spring continuously tending to backwind upon said shaft effective to exert a substantially constant force on said brush member.

References Cited in the file of this patent

UNITED STATES PATENTS

| | | |
|---|---|---|
| 1,495,203 | Roberg | May 27, 1924 |
| 1,533,237 | Dobson | Apr. 14, 1925 |
| 2,481,499 | Collura | Sept. 13, 1949 |
| 2,488,788 | Weilbaecher | Nov. 22, 1949 |
| 2,602,100 | McDonald | July 1, 1952 |
| 2,956,795 | Foster | Oct. 18, 1960 |